Patented Aug. 12, 1952

2,606,916

UNITED STATES PATENT OFFICE 2,606,916

PROCESS OF LIBERATING AND RECOVERING OIL FROM MATERIALS CONTAINING STARCH, PROTEINS, AND OIL

Elton R. Darling, Muncie, Ill., and William E. C. Yelland, Washington, D. C., assignors to Lauhoff Grain Company, Danville, Ill., a corporation of Illinois No Drawing. Application May 10, 1949, Serial No. 92,521

6 Claims. (Cl. 260—412.3)

The present invention relates to an improved process for the liberation and recovery of oil from materials containing starch, proteins and oil.

The process has particular applicability to the treatment of certain cereal products that contain starch, protein and fatty substances, mainly oils; the process providing an effective method for the recovery of the oil without any deleterious effects upon either the starches or proteins contained in the material. Specifically, the process may be employed for the recovery of corn oil from certain by-products of the dry-milling of corn. The invention may, however, also be successfully applied to the treatment of other oil-containing materials, as soy bean flour, cottonseed, comminuted peanuts and the like.

One of the outstanding advantages of the present process is that it avoids the use of organic solvents of a volatile nature, which would have to be removed from the oil by distillation, and which are likely to leave an undesirable taste in the oil.

Another advantage is that it avoids the use of presses, such as have been used for the extraction of oil from cottonseed, etc., thereby providing a residue that lends itself particularly well to the further separation of the said residue into unbroken starch granules and a dispersion of protein, which latter is substantially undenatured and can be separately recovered, as disclosed and claimed in our co-pending application Serial No. 87,562, filed April 14, 1949, now U. S. Patent No. 2,534,249.

It is therefore one of the primary objects of the present invention to provide a process for the selective separation of the oil and proteins contained in cereal products.

A further object is to pre-treat certain cereal products which contain oil, proteins, and starch, so that the latter two materials may be more effectively subsequently separated.

A still further object is to provide a process for the recovery of oil contained in the by-products of the dry-milling of corn, without adversely affecting the starch contained in said by-product, so that it may be subsequently recovered in the form of unchanged starch granules.

Other objects will become apparent from the further description of the present invention hereinbelow.

While many alkaline materials may be employed for the selective emulsification of the oil contained in the materials treated by the present process, provided sufficient care is used to avoid solubilization or colloidal dispersion of the protein, and possible softening or even incipient gelatinization of the starch, yet it has been found advisable to employ such alkaline-reacting materials that, even if accidentally present in areas of local over-concentration, would not disperse the proteins or attack the starches. Materials which could be used under careful control are the alkalies, alkaline reacting salts such as the alkali carbonate, etc., but it is preferred to employ certain alkaline-reacting materials that contain nitrogen, primarily ammonium hydroxide, ammonium carbonate or one of the ethanolamines, especially the alkaline-reacting monoethanolamine.

In essence the process comprises suspending the material that is to be treated in an aqueous solution of an alkali having a low enough pH to avoid dissolving or dispersing the protein or to gelatinize or swell the starch granules contained in the material. The suspension is agitated sufficiently to assure good contact with the material that is undergoing treatment, the operation being preferably conducted at ordinary room temperatures (say from 50° to 100° F.), and for a time period of, say, about two hours; although there is nothing critical about such time or temperature. But as no heating is required at any stage of the procedure, there is a considerable saving both in equipment and cost of operation.

It has also been found to be advantageous to have present certain emulsifying agents that tend to produce oil-in-water emulsion, although they should be of a type that can subsequently be rendered ineffective, so that the emulsion produced may be readily broken and resolved into separable layers of oil and aqueous substrata.

The invention will be described in connection with the specific treatment of a by-product of the dry-milling of corn, said by-product having hitherto formed merely a relatively cheap form of feed, it having been believed that the oil, protein and starch content thereof could not economically be resolved and separately recovered.

This material has the following average composition:

| | Per cent |
|---|---|
| Moisture | 14.0 |
| Dry basis analysis: | |
|     Protein | 9.38 |
|     Crude fat | 6.14 |
|     Ash | 1.90 |
|     Crude fiber | 3.66 |

The degree of comminution of this material, which is a typical by-product of the making of hominy grits, is as follows, as shown in the subjoined screen-analysis thereof:

| | Per cent |
|---|---|
| All through 8 mesh. | |
| On 10 mesh | 0.3– 1.5 |
| On 12 mesh | 0.5– 3.0 |
| On 14 mesh | 1.4– 4.7 |
| On 16 mesh | 3.8– 7.5 |
| On 20 mesh | 10.0–11.9 |
| On 24 mesh | 5.7– 7.0 |
| On 28 mesh | 10.5–12.6 |
| On 32 mesh | 7.7– 9.2 |
| On 35 mesh | 6.2– 9.4 |
| On 42 mesh | 4.1– 6.2 |
| On 48 mesh | 1.6– 5.3 |
| On 60 mesh | 2.3– 3.7 |
| On 65 mesh | 2.3– 4.9 |
| On 80 mesh | 1.3– 3.4 |
| On 100 mesh | 3.8– 4.7 |
| Through 100 mesh | 20.4–25.7 |

The actual operation was conducted as follows:

In a 220-gallon conical-bottomed tank were placed 92 U. S. gallons of water and one liter of concentrated ammonium hydroxide (about 27.9% NH$_4$OH content), whereupon there were added 235 pounds avoirdupois of the above material, having a 14% moisture content. After the added material has been thoroughly wetted, a second liter of ammonium hydroxide was added. This resulted in a suspension having a total volume of 115 gallons. This slurry was thoroughly agitated by a mechanical mixer for about two hours at the normal prevailing temperature of the building in which the operation was carried out. The alkalinity of the solution was measured during the operation and was found to vary between about pH 9.75 and 9.85. Under these conditions neither the alkali-soluble or salt-soluble proteins nor the starch of the material was solubilized or appreciably dispersed, but the oil contained in the material was dispersed throughout the solution in the form of discrete droplets of oil, i. e. an oil-in-water emulsion was formed.

Following the just-described steeping operation, the slurry was fed by means of a variable-speed pump at the rate of about 12 to 14 gallons per minute to a suitable centrifuge, such, for example, as the type known in the industry as a "Sharples Super-D-Canter," whereby substantially most of the steep solids were separated from the steep liquor. The amount of such steep liquor collected was measured at 77 gallons. It had the following analysis:

| | |
|---|---|
| Solids | 0.4285 g/10 ml. |
| Protein | 0.1690 g/10 ml. |
| Crude fat | 0.1067 g/10 ml. |

The amount of oil in the steep liquor was found to be about 6.9 pounds avoirdupois, or approximately 55 per cent of the original oil content of the material treated.

The oil-in-water emulsion thus obtained was then acidified by means of hydrochloric acid, which broke the emulsion so that the oil gradually rose to the top and formed a separate layer on the liquor. This oil was then decanted, washed to remove any adhering acid, and worked up into a commercial form of corn oil.

It was found advantageous to use a small amount of ammonium oleate in the original solution of ammonium hydroxide as this enhanced the yield, and also made emulsification of the oil more rapid and complete. However, as there is often a certain amount of free fatty acid in the oil-content of raw materials of the type amenable to the process of the present invention, this would quickly form the necessary amount of ammonium oleate (or its equivalent fatty acid soap of ammonia) to render unnecessary the actual addition of ammonium oleate. The ammonium oleate present in the eventual emulsion is rendered inactive as the result of the acidification, yielding an ammonium salt and liberating some oleic acid, which is unobjectionable in the finish product. However, if the oil be subsequently treated with dilute alkaline solutions, as is often done in refining such vegetable oil, this small amount of oleic acid would again be removed. The amount of ammonium oleate needed in the process is less than about $\frac{1}{10}$ of 1% on the basis of the material treated. Other equivalent amine salts may be used, such as the ammonium salts or amine salts of fatty acids such as linoleic, etc., or as may be contained in the corn oil. It is generally advisable not to use wetting agents of the type which are not capable of being rendered inert by acids, as these might interfere with the effectual breaking of the emulsion of oil in water.

In place of using ammonium hydroxide, the process can be carried out with ethanolamine, using an amount to yield about the same degree of alkalinity as when using ammonium hydroxide. Likewise, the process may also be carried out with the use of sufficient amounts of ammonium carbonate, also at a pH af about 9.75 to 9.85. In the case of monoethanol amine it has been found advantageous to operate at a somewhat high pH, say about pH 10.58. The action of the monoethanolamine can be enhanced by the use of a small quantity of ethanolamine oleate, instead of ammonium oleate.

The general procedural steps are, however, the same, no matter which particular alkaline-reacting material be selected for the emulsification of the oil.

As the apparatus employed for carrying out the present process is all standard readily obtainable equipment, it is not deemed necessary to illustrate the same.

Accordingly applicants claim as their invention:

1. Process of selectively separating oil from an oil-and-protein-containing comestible material which comprises suspending said material in an aqueous solution of an alkaline-reacting nitrogen-containing compound from the group consisting of ammonium hydroxide, ammonium carbonate and ethanolamine of a concentration sufficient to effect the emulsification of the oil in said material without materially affecting the protein, separating the resulting oil-in-water emulsion from the residual insoluble materials of said emulsion, breaking the thus treated emulsion to liberate the oil therefrom, and recovering the latter.

2. Process of recovering oil contained in the farinaceous by-product of the dry-milling of corn, and which contains starch, oil and protein, which comprises suspending said by-product in an aqueous solution of an alkaline-reacting nitrogen-containing compound from the group consisting of ammonium hydroxide, ammonium carbonate and ethanolamine of a concentration sufficient to effect the emulsification of the oil contained in said by-product without materially affecting the other constituents of said by-product, thereby forming an emulsion of the oil in the form of an oil-in-water emulsion, removing insoluble non-oily constituents from said emulsion, and breaking the latter to liberate the oil, and recovering the latter.

3. Process of separating a mixture of a protein, an oil and a starch, which comprises subjecting such a mixture to agitation in an aqueous solution of an alkaline-reacting substance of a concentration low enough to effect the emulsification of said oil into an oil-in-water emulsion but insufficiently high to gelatinize the starch or disperse or dissolve said protein, separating the resulting oil-in-water emulsion from the substantially unchanged protein and starch, liberating the oil from the thus treated emulsion, and recovering said oil.

4. The process as defined in claim 3, in which a small but effective amount of an acid-inactivatable wetting agent is employed to enhance the emulsification of the oil.

5. The process as defined in claim 4, in which such wetting agent is an ammonium soap of a fatty acid.

6. Process of liberating and recovering oil from an oil-containing farinaceous by-product of the dry-milling of corn which comprises suspending said material in a solution of ammonium hydroxide having a pH of about 9.75 to 9.85 and agitating it therein for about two hours at room temperature, separating undissolved material from the resulting oil-in-water emulsion of said oil, and breaking said emulsion to liberate the oil, and recovering the latter.

ELTON R. DARLING.
WILLIAM E. C. YELLAND.

REFERENCES CITED

The following references are of record in the file of this patent:

UNITED STATES PATENTS

| Number | Name | Date |
|---|---|---|
| 695,474 | McFarlane et al. | Mar. 18, 1902 |
| 2,376,568 | Altschul et al. | May 22, 1945 |
| 2,376,852 | Altschul et al. | May 22, 1945 |